Patented Feb. 24, 1953

2,629,418

UNITED STATES PATENT OFFICE 2,629,418

METHOD OF HULLING TUNG FRUIT AND THE LIKE

Horace L. Smith, Jr., and John G. Miller, Richmond, Va., assignors to Louisiana Tung Corporation, Covington, La., a corporation of Delaware No Drawing. Application November 16, 1951, Serial No. 256,842

10 Claims. (Cl. 146—220)

1

The invention relates to the treatment of the fruit of certain trees whereby to effect a rapid and efficient disintegration of the outer integuments thereof without substantial breakage or other damage to the seeds normally enclosed by such coverings, and has for its principal object the provision of an improved method of treating the fruit of the tung tree whereby an extremely high percentage of the kernels thereof may be recovered in an unbroken state and without damaged shells, to the end that they may be stored for indefinite periods without danger of the development of substantial amounts of free fatty acids which would render them unfit for the production of high grade tung oil.

Tung fruit is of generally spherical shape averaging about two inches in diameter and normally comprises from three to five seeds each composed of a kernel closely enveloped by a shell-like covering of about $\frac{1}{32}$ to $\frac{1}{16}$ of an inch in thickness. Each seed in turn is enclosed by a thinner and softer fibrous skin of about $\frac{1}{64}$ to $\frac{1}{32}$ of an inch thick; and the several seeds are closely nested in a generally spherical outer hull of tough fibrous material ranging in thickness from about $\frac{1}{16}$ to $\frac{1}{8}$ of an inch. Although comparatively soft when the fruit first falls from the tree, the outer hull becomes quite hard as the natural moisture evaporates therefrom.

The tung tree, although a native of China, is now grown more or less extensively in the Gulf Coast section of the United States, where the fruit matures in the late summer or early fall and drops to the ground from September through November, depending upon the variety of the tree, the specific location and seasonal conditions. The crop ordinarily is transported by the growers to centrally located tung mills, where the fruit is hulled, the seeds shelled, the kernels ground to a meal, and the oil expressed or extracted therefrom.

At the time the fruit drops from the tree it contains about 65% of moisture, of which over one-half is in the outer hull, and with the methods and disk hulling apparatus commonly employed it has been found virtually impossible to hull the fruit until its moisture content has been reduced to about 30%. In fact, from a practical standpoint a moisture content of from 15% to 20% has been desirable. Experience has also indicated that from the standpoint of efficiency in oil recovery, the best results are obtained if the seeds be processed when containing about 6% to 9% of moisture.

Since the mills are not equipped to receive

2 and store the crop during drying to the points above indicated, and since if stored in the condition in which it falls from the tree, i. e., with a moisture content of about 65%, there is extreme danger of the fruit heating, sprouting and/or molding, it is the usual practice for the growers to permit the fruit to remain upon the ground beneath the trees for natural field drying until the moisture content has been reduced to from 25% to 30%, at which point it may be safely stored. It is then transferred to specially constructed ventilated drying barns, in which it dries slowly to a moisture content of about 13% to 15%, with the kernels themselves containing approximately 7%. Under good weather conditions at least two weeks or more are required for the field drying, while the average time in the drying barns is about two months; but in abnormally wet years the crop may not dry on the ground sufficiently to safely permit transfer to the barns.

It has been appreciated that if the hulls were removed and only the seeds stored, not only would the storage space requirements be materially reduced but also that the drying time would be shortened considerably, since as previously indicated, the hulls contain more than one-half of the moisture present. To this end at least one form of apparatus has been heretofore proposed having in view the removal of the hulls of the fruit in the field, but experience with this machine has demonstrated that while it will hull fruit which has been field-dried to a moisture content of from 25% to 30% with breakage and/or shell damage to only 10% to 15% of the seeds, if for any reason the moisture content of the whole fruit be lower, the percentage of damaged seeds increases in proportion thereto.

While breakage of the kernels or damage to the shells thereof would not be of material importance if the seeds were to be processed within a relatively short time thereafter, it is highly important to avoid it as much as possible if the seeds are to be stored for further drying. This is because moist broken seeds, or those having their shells cracked, develop free fatty acids quite rapidly, and will heat spontaneously in storage, unless forced ventilation be employed. For example, in one instance it was found that seeds containing 26% of moisture and 7% of which had their shells broken, showed an average increase in acid value from 0.6 to 4.1 when stored for about 10 weeks without artificial drying; and when the broken or damaged seeds were picked out and analyzed separately their acid value was found to be 26.0. While an acid value of 4.1 for the batch would not necessarily be excessive, since A. S. T. M. specifications permit an acid value of as high as 8.0 for raw tung oil, it not infrequently happens that an oil of low acid value is required, in which case a value of not in excess of 3.0 is specified. Thus, since the acid value of broken or damaged seeds may run as high as 26.0 or more, it obviously is desirable to keep the percentage of such seeds as low as possible.

Although as mentioned above, the outer hulls of the tung fruit are moist and relatively soft when the fruit falls from the tree, such hulls become hardened and toughened as they dry out, and while in such condition they may be cracked by percussion in order to get at the seeds, such mode of opening them breaks too many of the kernels and/or their enclosing shells to be satisfactory. The drying hulls also become water resistant or repellant and by the time the field drying is completed they have reached a state in which it is practically impossible to re-saturate and soften them by merely immersing them in or spraying them with water. This is because the evaporation of the natural moisture has left thousands of minute air-filled cells or interstices dispersed throughout the hull structure, which not only decrease the specific gravity of the fruit to below 1, whereby it will float on water, but also because of the trapping of air therein, prevent the structure from readily re-absorbing water.

The process of the present invention has been evolved in the light of the above-stated conditions, limitations and desiderata in this field, and provides a procedure whereby the hardened outer hulls of partially or even fully dried tung fruit may be efficiently removed from the seeds with a substantial minimum of breakage of the latter into pieces and/or damage to their shells, to the end that the seeds may be stored for as long as may be desirable without an undue increase in their acid content. As indicative of the efficiency of the process, in test runs under various conditions the percentage of broken or damaged seeds consistently has not exceeded 5% and in many instances has been appreciably lower.

Essentially the procedure is as follows:

A batch of whole fruits is introduced into a suitable chamber from which the air is then exhausted by any appropriate air pump, whereby to withdraw substantially all of the air from the interstices or cells of the outer hulls. Since a vacuum as high as feasible from a practical standpoint is desired, no water or other liquid, except such as may be carried by the fruits, is present in the chamber as it would limit the degree of vacuum obtainable to the vapor pressure of the water at its instant temperature. In some instances some water may be unavoidably present on the outer surfaces of the fruit hulls, which at the prevailing temperature will limit the absolute pressure attainable to the neighborhood of 2 inches of mercury, but with normal field-dried fruit which has not been exposed to water, a vacuum on the order of 0.1 inch of mercury (absolute) is attainable and desirable.

When the batch of fruit within the chamber has been thus substantially de-aerated the vacuum pump is stopped or cut off and without relieving the vacuum in the chamber it is flooded with water which may now enter the interstices of the fruit hulls since the air which normally would be entrapped therein and prevent entrance of the water has been removed. Such entry will take place at normal atmospheric pressure but in order to facilitate and speed it up, a pressure of up to 100 lbs. per sq. in. preferably is applied to the water. This pressure is continued for a time sufficient, ordinarily from one-half to two minutes, to secure substantially complete permeation of the water throughout the outer hulls without material contact with or penetration of the shells which enclose the kernels. Hydration of the hulls in this manner has the effect of again softening them whereby they may be the more readily disintegrated and separated from the seeds without breakage of the kernels or damage to the shells thereof. At the same time the moisture content of the already partially dried seeds is not raised appreciably and thus the time necessary to complete drying of the seeds in storage is not lengthened.

When hydration of the outer hulls has been completed the pressure in the chamber is relieved and the batch of fruits removed therefrom for further treatment whereby to disintegrate the softened hulls and separate them from the seeds. The disintegration may be conveniently accomplished by indiscriminately feeding the fruits between a pair of yieldable differentially traveling roughened surfaces such as may be provided, for example, by the opposed faces of adjacent substantially parallel runs of a pair of superposed endless canvas, rubber or rubber-faced belts driven in the same or in opposite directions at differential speeds, said adjacent runs being spaced apart a distance less than the average diameter of the whole fruits but greater than the average size of the seeds. When subjected to such an action or one similar thereto, the fibers of the softened hulls are torn apart and the seeds released therefrom with a minimum of breakage or other damage to the kernels or their shells.

The seeds and the disintegrated hulls emerge from the disintegrator in a commingled mass and may be separated from one another in any appropriate manner. Since the hydration of the hulls has raised their specific gravity to above 1 whereas the seeds, because of the oil contained in the kernels and the fact that the moisture content of their shells has not been appreciably raised by the foregoing treatment, have a specific gravity of less than 1, a common form of hydraulic classification may be employed to effect the separation. That is to say, the commingled mass discharged from the disintegrator may be deposited in a vat of water, in which the disintegrated hulls will sink to the bottom while the seeds will float at the surface and may be readily skimmed therefrom substantially free from hull fiber. The seeds may then be stored for as long as may be necessary without danger of heating and sprouting, and because of the almost complete elimination of broken or cracked seeds, with a minimum of development of free fatty acids. Obviously, the space requirements for the storage of the de-hulled seeds will be at least 50% less than they would have been for the whole fruits.

While water has been mentioned above as the liquid employed for permeating and softening the hulls, because it is the cheapest and most logical liquid for satisfactorily accomplishing the purpose, any other liquid which will perform the same function without detriment to the seeds may be substituted therefor.

For purposes of the disclosure required by the

Patent Statutes the process has been herein described with reference to tung fruit, since it has been devised primarily for use in that field; however, it will be readily appreciated by those skilled in the art that it may be equally applicable to other fruits and/or nuts where similar conditions or considerations are present.

What is claimed is:

1. The method of treating tung fruits whereby to remove the outer integuments thereof from the seeds with substantially a minimum of damage to the latter, which method comprises subjecting the whole fruits to a relatively high vacuum whereby to de-aerate the outer hull structure; then treating the de-aerated whole fruits with an inert liquid at a higher pressure, whereby such liquid will permeate and soften said hull structure; and then subjecting the whole fruits to forces acting to disintegrate the softened hull structure only and detach it from the seeds.

2. The method of treating partially dehydrated tung fruits whereby to remove the hardened outer hulls thereof from the seeds with substantially a minimum of damage to the latter, which method comprises subjecting the whole fruits to sub-atmospheric pressure in the presence of only such liquid as is carried by the fruits, whereby to substantially completely de-aerate the outer hull structure; then immersing the de-aerated whole fruits in an inert liquid at a higher pressure, whereby such liquid may permeate and soften said hull structure; and then subjecting the whole fruits to rending forces to disintegrate the softened hull structure and detach it from the seeds.

3. The method of treating partially dehydrated tung fruits whereby to remove the outer integuments thereof from the seeds with substantially a minimum of damage to the latter, which method comprises subjecting the whole fruits to sub-atmospheric pressure in the presence of only such liquid as is carried by the fruits, whereby to remove substantially all air from the interstices of the outer hull structure; then submerging the de-aerated whole fruits in water at a higher pressure for a time sufficient for such water to permeate and soften said hull structure only; and then subjecting the whole fruits to rending forces to disintegrate the softened hull structure and detach it from the seeds.

4. The method of treating partially dehydrated tung fruits whereby to remove the hardened outer hulls thereof from the seeds with substantially a minimum of damage to the latter, which method comprises vacuumizing the whole fruits to an absolute pressure at least as low as 2 inches of mercury, in the presence of only such liquid as is carried by the fruits, whereby to de-aerate the outer hull structure; then submerging the de-aerated whole fruits in water at a higher pressure for a time sufficient for such water to permeate and soften said hull structure only; and then subjecting the whole fruits to rending forces to disintegrate the softened hull structure and detach it from the seeds.

5. The method of treating partially dehydrated tung fruits whereby to remove the hardened outer hulls thereof from the seeds with substantially a minimum of damage to the latter, which method comprises subjecting the whole fruits to absolute pressures within the range of from 2 inches to 0.1 inch of mercury, in the presence of only such moisture as is carried by the fruits, whereby to extract substantially all air from the interstices of the outer hull structure; then submerging the whole fruits in water at a higher pressure for a time sufficient for such water to permeate and soften said outer hull structure only; and then subjecting the whole fruits to rending forces to disintegrate the softened hull structure and detach it from the seeds.

6. The method of treating partially dehydrated tung fruits whereby to remove the hardened outer hulls thereof from the seeds with substantially a minimum of damage to the latter, which method comprises subjecting the whole fruits to an absolute pressure at least as low as 2 inches of mercury, in the presence of only such moisture as is carried by the fruits, whereby to de-aerate the hull structure; maintaining said fruits in such de-aerated condition while submerging them in water; subjecting said water to super-atmospheric pressure for a time sufficient for it to permeate and soften said hull structure only; and then applying rending forces to the whole fruits to disintegrate the softened hull structure and detach it from the seeds.

7. The method of treating partially dehydrated tung fruits whereby to remove the hardened outer hulls thereof from the seeds with substantially a minimum of damage to the latter, which method comprises subjecting the whole fruits to absolute pressures within the range of from 2 inches to 0.1 inch of mercury, in the presence of only such moisture as is carried by the fruits, whereby to substantially completely de-aerate the hull structure; maintaining said fruits in such de-aerated condition while submeriging them in water; subjecting said water and submerged fruits to pressures up to 100 lbs. per sq. in. for a time sufficient to cause said water to permeate and soften said hull structure only; and then applying rending forces to the whole fruits to disintegrate the softened hull structure and detach it from the seeds.

8. The method of treating partially dehydrated tung fruits whereby to remove the hardened outer hulls thereof from the seeds with substantially a minimum of damage to the latter, which method comprises subjecting the whole fruits to absolute pressures on the order of 0.1 inch of mercury in the presence of only such moisture as is carried by the fruits, whereby to substantially completely de-aerate the hull structure; maintaining the fruits in such de-aerated condition while submerging them in water; subjecting said water to pressures on the order of 100 lbs. per sq. in. for from one-half minute to two minutes, whereby to cause said water to permeate and soften said hull structure only; and then removing the fruits from the water and subjecting them to rending forces to disintegrate the softened hull structure and detach it from the seeds.

9. The method of removing the seeds from partially dehydrated tung fruits without substantial damage to said seeds whereby they may be stored for indefinite periods without excessive development of free fatty acids, which method comprises introducing the whole fruits into a chamber in which only such liquid is present as is carried by the fruits; reducing the pressure in such chamber to not in excess of 2 inches of mercury absolute, whereby to de-aerate the hardened outer hull structure of the fruits; flooding the vacuumized chamber with water to submerge the de-aerated fruits therein; subjecting said water to super-atmospheric pressure for a time sufficient to cause it to permeate and soften said outer hull structures only; relieving said pressure and removing the fruits from the chamber; and subjecting the softened fruits to the action of differentially moving surfaces whereby to disintegrate the outer hull structure and detach it from the seeds.

10. The method of removing the seeds from partially dehydrated tung fruits without substantial damage to said seeds whereby they may be stored for extended periods without excessive development of free fatty acids, which method comprises introducing the whole fruits into a chamber in which only such liquid is present as is carried by the fruits; reducing the absolute pressure in such chamber to within the range of from 2 inches to 0.1 inch of mercury, whereby to de-aerate the hardened outer hull structure of the fruits; flooding the vacuumized chamber with water to submerge the de-aerated fruits therein; subjecting said water to a pressure of approximately 100 lbs. per sq. in. for from one-half minute to two minutes to cause the water to permeate and soften said outer hull structures only; relieving said pressure and removing the fruits from the chamber; passing the fruits between and in contact with differentially traveling surfaces which subject the softened hull structures to rending forces whereby to disintegrate such structures and detach them from the seeds; and segregating the seeds from the disintegrated hull material.

HORACE L. SMITH, Jr.
JOHN G. MILLER.

No references cited.